(12) United States Patent
Lu (10) Patent No.: US 12,298,843 B2
(45) Date of Patent: May 13, 2025

(54) DATABASE MANAGEMENT METHOD AND APPARATUS

(71) Applicant: HUAWEI TECHNOLOGIES CO., LTD., Shenzhen (CN)

(72) Inventor: Yunfei Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/357,925

(22) Filed: Jul. 24, 2023

(65) Prior Publication Data

US 2023/0367670 A1   Nov. 16, 2023

Related U.S. Application Data

(63) Continuation of application No. PCT/CN2022/072404, filed on Jan. 17, 2022.

(30) Foreign Application Priority Data

Jan. 25, 2021   (CN) .......................... 202110099384.7

(51) Int. Cl.
*G06F 16/00*   (2019.01)
*G06F 11/07*   (2006.01)
(Continued)

(52) U.S. Cl.
CPC ...... *G06F 11/0793* (2013.01); *G06F 11/0775* (2013.01); *G06F 11/3409* (2013.01); *G06F 16/24539* (2019.01)

(58) Field of Classification Search
CPC ............. G06F 11/0793; G06F 11/0775; G06F 11/3409; G06F 16/24539; G06F 16/217; G06F 16/2308; G06F 11/3452
See application file for complete search history.

(56) References Cited

U.S. PATENT DOCUMENTS 5,907,844 A * 5/1999 Guay ..................... G06F 16/217
8,010,337 B2 * 8/2011 Narayanan .......... G06F 11/3419
703/22

(Continued)

FOREIGN PATENT DOCUMENTS

CN   112181840 A   1/2021

OTHER PUBLICATIONS

Gu et al., "Online Anomaly Prediction for Robust Cluster Systems", IEEE, 1084-4627/09, pp. 1000-1011 (Year: 2009).*

(Continued)

*Primary Examiner* — Alexander Khong
(74) *Attorney, Agent, or Firm* — Leydig, Voit & Mayer, Ltd.

(57) ABSTRACT

A database management method and apparatus are provided. The database management method includes: obtaining statistical data of first database resources in a database, where the statistical data is usage data of the first database resources that is obtained through statistical collection; extracting a first usage feature of the first database resources from the statistical data; inputting the first usage feature into a competition evaluation model, to obtain an evaluation result, where the competition evaluation model is obtained through training based on a second usage feature of at least one database resource; and outputting competition alarm information when the evaluation result indicates that a second database resource is an abnormal resource, where the competition alarm information indicates that a competitive bottleneck occurs in the second database resource, and the second database resource is some or all of the first database resources.

20 Claims, 6 Drawing Sheets

(51) Int. Cl.
*G06F 11/34* (2006.01)
*G06F 16/2453* (2019.01)

(56) References Cited

U.S. PATENT DOCUMENTS

| | | | | |
|---|---|---|---|---|
| 9,935,812 B1* | 4/2018 | Cirne | ................... | G06F 11/36 |
| 2013/0218973 A1* | 8/2013 | Good | ................... | H04L 67/306 |
| | | | | 709/204 |
| 2013/0226708 A1* | 8/2013 | Good | ................... | G06Q 50/01 |
| | | | | 705/14.66 |
| 2013/0298006 A1* | 11/2013 | Good | ................... | G06F 16/957 |
| | | | | 715/234 |
| 2015/0350019 A1* | 12/2015 | Terayama | ........... | G06F 11/3003 |
| | | | | 709/224 |
| 2021/0365762 A1* | 11/2021 | Rafey | ................... | G16Y 40/10 |
| 2022/0230076 A1* | 7/2022 | Okawa | ................ | A61B 5/7267 |

OTHER PUBLICATIONS

Ibidunmoye et al., "Performance Anomaly Detection and Bottleneck Identification", ACM, 0360-0300/2015/07-ART4, pp. 1-35 (Year: 2015).*

Mozafari et al., "Performance and Resource Modeling in Highly-Concurrent OLTP Workloads," Proceedings of the 2013 International Conference on Management of Data, SIGMOD'13, XP055141625, total 12 pages (Jan. 1, 2013).

* cited by examiner

SQL>select*from dv_spinlocks;

| session ID | type | spins | sleeps | fails | requests |
|---|---|---|---|---|---|
| 0 | TXN | 0 | 0 | 0 | 0 |
| 0 | TXN_LIST | 0 | 0 | 0 | 595968 |
| 0 | INC_SCN | 0 | 0 | 0 | 0 |
| 0 | REDO_BUFFER | 0 | 0 | 0 | 1 |
| 0 | COMMIT_QUEUE | 0 | 0 | 0 | 0 |
| 0 | CKPT_QUEUE | 0 | 0 | 0 | 2 |
| 0 | BUFFER | 0 | 0 | 0 | 121 |
| 0 | BUCKET | 0 | 0 | 0 | 10796 |
| 0 | SPACE | 0 | 0 | 0 | 0 |
| 0 | LOG_FLUSH | 0 | 0 | 0 | 1 |

(a)

SQL>select*from dv_page;

| Pool ID | file | page ID | spins | memcpys | bucket_len |
|---|---|---|---|---|---|
| 0 | 1 | 1 | 0 | 0 | 0 |
| 0 | 1 | 2 | 3 | 0 | 0 |
| 0 | 3 | 2 | 0 | 0 | 0 |

DATABASE MANAGEMENT METHOD AND APPARATUS

CROSS-REFERENCE TO RELATED APPLICATIONS

This application is a continuation of International Application No. PCT/CN2022/072404, filed on Jan. 17, 2022, which claims priority to Chinese Patent Application No. 202110099384.7, filed on Jan. 25, 2021. The disclosures of the aforementioned applications are hereby incorporated by reference in their entireties.

TECHNICAL FIELD

Embodiments of this application relate to the field of information technologies, and in particular, to a database management method and apparatus.

BACKGROUND

Acceleration of informatization leads to an explosive growth of data. A database management system (DBMS) plays an increasingly important role as core software for data management and analysis.

On-line transaction processing (OLTP) is a main application of conventional relational databases. The on-line transaction processing focuses on transaction processing efficiency, which is measured by a quantity of transactions processed per second. An OLTP system emphasizes database memory efficiency, command rates of various indicators of a memory, a bind variable, and a concurrent operation.

Currently, a high concurrency feature of the OLTP system causes frequent resource competition in the system. In addition, because there are a large quantity of resources in the system, a database resource in which a competitive bottleneck occurs cannot be accurately located.

SUMMARY

This application provides a database management method and apparatus, to accurately locate a database resource in which a competitive bottleneck occurs.

According to a first aspect, this application provides a database management method. The method may be applied to a database management system. The method may include: obtaining statistical data of first database resources in a database, where the statistical data is usage data of the first database resources that is obtained through statistical collection; extracting a first usage feature of the first database resources from the statistical data: inputting the first usage feature into a competition evaluation model, to obtain an evaluation result; and outputting competition alarm information when the evaluation result indicates that a second database resource is an abnormal resource, where the competition alarm information indicates that a competitive bottleneck occurs in the second database resource. Herein, the competition evaluation model is obtained through training based on a second usage feature of the first database resources. The second database resource is some or all of the first database resources. In other words, the second database resource may be one or more first data resources.

In some possible implementations, the first database resource may be a lock (which may also be understood as a critical area corresponding to the lock) in the database, a page, or the like.

It may be understood that the competition evaluation model is obtained through training based on the second usage feature of the first database resources. Herein, the second usage feature may be a usage feature sample of the first database resources specially used to train the competition evaluation model, or may be a usage feature extracted from historical usage data (or existing usage data) of the first database resources.

In some possible implementations, the output competition alarm information may carry an identifier of the second database resource. In this way, after viewing the competition alarm information, a database administrator (DBA) can accurately locate, based on the identifier of the second database resource, the database resource in which the competitive bottleneck occurs. Further, the DBA can perform precise optimization on the competitive bottleneck, to improve maintainability of the database.

In this application, the database resource in which the competitive bottleneck occurs in a database system is identified by using the competition evaluation model, to accurately locate the resource in which the competitive bottleneck occurs. Further, after locating the competitive bottleneck, the database management system notifies the DBA of the competitive bottleneck, so that the DBA can perform precise optimization on the competitive bottleneck. This greatly reduces workload of the DBA, helps the DBA find a problem in time, and improve maintainability of the database.

In some possible implementations, the method further includes: obtaining optimization information corresponding to the second database resource when the evaluation result indicates that the second database resource is an abnormal resource; and outputting the optimization information. The optimization information indicates an optimization policy associated with the second database resource.

It may be understood that, to help the DBA analyze a status of the database system, the database management system may further associate different optimization policies for different second database resources. When the evaluation result indicates that the second database resource is an abnormal resource, in addition to outputting the competition alarm information, the database management system may further output the optimization information associated with the second database resource, to indicate the optimization policy that may be used for the second database resource. Therefore, the DBA can quickly locate a performance problem, analyze system status under load, and provide a corresponding optimization solution based on the competition alarm information and the optimization information, to improve maintainability of the database system.

In some possible implementations, the obtaining statistical data of first database resources in a database includes: querying a first view corresponding to the first database resources in the database, to obtain the statistical data. The first view is used to collect statistics on the usage data of the first database resources.

It may be understood that the first view may be a lock view or a page view:

In some possible implementations, when the first database resources include at least one type of lock in the database, for a first lock in the at least one type of lock, the first view includes one or a combination of the following plurality of pieces of data: a quantity of query times of the first lock, block sleep time of the first lock, a quantity of failures in obtaining the first lock, and a quantity of successes in obtaining the first lock. Herein, the first lock may be understood as any type of lock in the at least one type of lock.

In this application, when the first database resources include the at least one type of lock in the database, the first view may further include an identifier of a session in which the first lock is located and a lock type of the first lock.

In some possible implementations, the first database resources include the at least one type of lock in the database, and the second database resource is an abnormal lock.

In some possible implementations, when the second database resource is a bucket-level lock (SPIN_BUCKET), the competition alarm information carries a page identifier associated with the bucket-level lock.

In some possible implementations, the inputting the first usage feature into a competition evaluation model, to obtain an evaluation result includes: calculating a distance between the first usage feature and a superior feature; and outputting a first evaluation result if the distance exceeds a preset threshold, where the first evaluation result indicates that the second database resource is the abnormal resource: or outputting a second evaluation result if the distance does not exceed a preset threshold, where the second evaluation result indicates that the second database resource is a non-abnormal resource.

In some possible implementations, when the first database resources include at least one page in the database, for a first page in the at least one page, the first view includes one or a combination of the following plurality of pieces of data: a quantity of query times of a lock of a bucket in which the first page is located, a quantity of copy times of the first page, and a length of the bucket in which the first page is located. Herein, the first page may be understood as any one of the at least one page.

In this application, when the first database resources include the at least one page in the database, the first view may further include an identifier of a storage pool in which the first page is located, a file to which the first page belongs, and an identifier of the first page.

In some possible implementations, when the first database resources include the at least one page in the database, the second database resource is a hotpage.

In some possible implementations, the inputting the first usage feature into a competition evaluation model, to obtain an evaluation result includes: performing binary classification on the first usage feature by using a logistic regression function, to output the evaluation result. The evaluation result indicates whether the second database resource is the abnormal resource.

In some possible implementations, the querying a first view corresponding to the first database resources in the database includes: querying the first view by using a select statement (for example, a select statement).

According to a second aspect, this application provides a database management apparatus. The database management apparatus may be a database management system or a chip or a system on chip in a database management system, or may be a functional module that is in a database management system and that is configured to implement the method in any one of the first aspect or the possible implementations of the first aspect. The database management apparatus may implement functions performed by the database management system in any one of the first aspect or the possible implementations of the first aspect. The functions may be implemented by hardware executing corresponding software. The hardware or software may include one or more modules corresponding to the foregoing functions. The database management apparatus includes: a feature extraction module, configured to obtain statistical data of first database resources in a database, where the statistical data is usage data of the first database resources that is obtained through statistical collection; and extract a first usage feature of the first database resources from the statistical data: an evaluation module, configured to input the first usage feature into a competition evaluation model, to obtain an evaluation result, where the competition evaluation model is obtained through training based on a second usage feature of the first database resources; and an alarm module, configured to output competition alarm information when the evaluation result indicates that a second database resource is an abnormal resource, where the competition alarm information indicates that a competitive bottleneck occurs in the second database resource, and the second database resource is some or all of the first database resources.

In some possible implementations, the alarm module is further configured to: obtain optimization information corresponding to the second database resource when the evaluation result indicates that the second database resource is the abnormal resource; and output the optimization information, where the optimization information indicates an optimization policy associated with the second database resource.

In some possible implementations, the feature extraction module is specifically configured to query a first view corresponding to the first database resources in the database, to obtain the statistical data. The first view is used to collect statistics on the usage data of the first database resources.

In some possible implementations, when the first database resources include at least one type of lock in the database, for a first lock in the at least one type of lock, the first view includes one or a combination of the following plurality of pieces of data: a quantity of query times of the first lock, block sleep time of the first lock, a quantity of failures in obtaining the first lock, and a quantity of successes in obtaining the first lock.

In some possible implementations, the second database resource is an abnormal lock.

In some possible implementations, when the second database resource is a bucket-level lock, the competition alarm information carries a page identifier associated with the bucket-level lock.

In some possible implementations, the evaluation module is specifically configured to: calculate a distance between the first usage feature and a superior feature; and output a first evaluation result if the distance exceeds a preset threshold, where the first evaluation result indicates that the second database resource is an abnormal resource: or output a second evaluation result if the distance does not exceed a preset threshold, where the second evaluation result indicates that the second database resource is a non-abnormal resource.

In some possible implementations, when the first database resources include at least one page in the database, for a first page in the at least one page, the first view includes one or a combination of the following plurality of pieces of data: a quantity of query times of a lock of a bucket in which the first page is located, a quantity of copy times of the first page, and a length of the bucket in which the first page is located.

In some possible implementations, the second database resource is a hotpage.

In some possible implementations, the evaluation module is specifically configured to perform binary classification on the first usage feature by using a logistic regression function, to output the evaluation result. The evaluation result indicates whether the second database resource is an abnormal resource.

In some possible implementations, the feature extraction module is configured to query the first view by selecting an interface.

In some possible implementations, the first database resources include the lock or the page.

According to a third aspect, this application provides a database management system, including the data management apparatus in any one of the second aspect or the implementations of the second aspect.

According to a fourth aspect, this application provides an electronic device, including a processor and a memory. The processor is coupled to the memory. The processor is configured to read and execute instructions in the memory, to implement the database management method in any one of the first aspect or the possible implementations of the first aspect.

According to a fifth aspect, this application provides a computer-readable storage medium. The computer-readable storage medium stores instructions, and when the instructions are run on a computer, the instructions are used to perform the database management method in any one of the first aspect or the possible implementations of the first aspect.

According to a sixth aspect, this application provides a computer program product including instructions. When the computer program product is executed on a computer, the computer implements the database management method in any one of the first aspect or the possible implementations of the first aspect.

It should be understood that technical solutions in the second to the sixth aspects of this application are consistent with technical solutions in the first aspect of this application, and beneficial effect achieved by the aspects and corresponding feasible implementations are similar. Details are not described again.

BRIEF DESCRIPTION OF DRAWINGS

To describe technical solutions in embodiments of this application more clearly, the following describes the accompanying drawings for describing embodiments of this application or the background.

DESCRIPTION OF EMBODIMENTS

The following describes embodiments of this application with reference to the accompanying drawings in embodiments of this application. In the following descriptions, reference is made to the accompanying drawings that form a part of this application and show specific aspects of embodiments of this application in an illustrative manner or in which specific aspects of embodiments of this application may be used. It should be understood that embodiments of this application may be used in other aspects, and may include structure or logical changes not depicted in the accompanying drawings. For example, it should be understood that disclosure with reference to a described method may also be applied to a corresponding device or system for performing the method, and vice versa. For example, if one or more specific method steps are described, a corresponding device may include one or more units such as functional units for performing the described one or more method steps (for example, one unit performs the one or more steps: or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include one step for implementing functionality of one or more units (for example, one step for implementing functionality of one or more units: or a plurality of steps, each of which is for implementing functionality of one or more units in a plurality of units), even if such one or more of steps are not explicitly described or illustrated in the accompanying drawings. Further, it should be understood that features of various example embodiments and/or aspects described in this specification may be combined with each other, unless otherwise specified.

OLTP (online transaction processing) is a highly transactional system. Generally, the OLTP is an online system with high availability, mainly involving small transactions and queries. An evaluation of the system generally depends on a quantity of transactions executed per second and a quantity of executed structured query language (SQL) statements. In an OLTP system, a single database usually processes hundreds or thousands of transactions per second, and the quantity of structured query language statements (for example, select statements) executed per second is thousands or even tens of thousands. It can be seen that a concurrent amount of the OLTP system is large (namely, a high concurrent scenario).

For a system with a large concurrency amount, different users (namely, process sessions) can access different resources or a same resource. Consequently, a large quantity of resources are occupied. When a plurality of users access the same resource at the same time, resource competition may occur. When the same resource is accessed by enough users, the resource may become a performance bottleneck (which may also be understood as a performance blocking point or a competitive bottleneck). However, only simple system-level monitoring cannot accurately locate whether competition occurs, the competition between the users, a location in which the competition occurs, and whether the performance bottleneck occurs.

Figure 1:
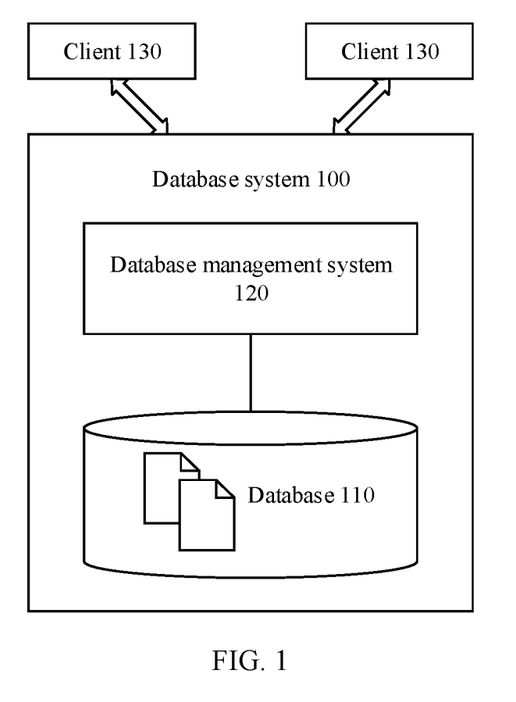
FIG. 1 is a schematic diagram of a typical logical architecture of a database system.

To resolve this problem, an embodiment of this application provides a database management method. The method may be applied to a database system (DBS). FIG. 1 is a schematic diagram of a typical logical architecture of a database system. As shown in FIG. 1, a database system 100 includes a database (DB) 110 and a database management system (DBMS) 120.

The database 110 is an organized data set stored in a data storage, namely, an associated data set organized, stored, and used based on a specific data model. Based on different data models used for organizing data, the data may be divided into a plurality of types, for example, relational data, graph data, and time series data. The relational data is data modeled by using a relational model, and is usually represented as a table, where a row in the table indicates a set of associated values of an object or entity. The graph data is referred to as a "graph", and indicates a relationship, for example, a social relationship, between objects or entities. The time series data is referred to as time series data, and is a data column recorded and indexed in a time sequence, and is used to describe status change information of an object in a time dimension.

During actual application, the data storage may include but is not limited to a solid-state disk (SSD), a disk array, a cloud storage, or non-transitory computer-readable storage medium of another type. A person skilled in the art may understand that the database system may include components more or less than those shown in FIG. 1, or include components different from those shown in FIG. 1. FIG. 1 merely shows components more related to implementations disclosed in embodiments of the present invention.

The database management system 120 is a core of the database system, and is system software used to organize, store, and maintain data. A client 130 can access the database 110 by using the database management system 120. A database administrator (DBA) can also maintain a database by using the database management system 120. The database management system 120 provides various functions for the client 130 to establish, modify, and query the database. The client 130 may be an application program or user equipment. The functions provided by the database management system 120 may include but are not limited to the following items: (1) Data definition function: The database management system 120 provides a data definition language (DDL) to define a structure of the database 110, where the DDL is used to depict a database framework, and may be stored in a data dictionary. (2) Data access function: The database management system 120 provides a data manipulation language (DML) to implement basic access operations on the database 110, for example, retrieval, insertion, modification, and deletion. (3) Database operation management function: The database management system 120 provides a data control function to effectively control and manage operation of the database 110, to ensure correct and effective data. (4) Database establishment and maintenance functions: Functions such as loading of initial data of the database, dump, restoration, and reorganization of the database, and monitoring and analysis of system performance are included. (5) Transmission of the database: The database management system 120 provides transmission of processed data, to implement communication between the client 130 and the database management system 120, and usually coordinates with an operating system to complete the transmission of the processed data.

The following describes the database management method provided in this embodiment of this application with reference to the database system.

Figure 2:
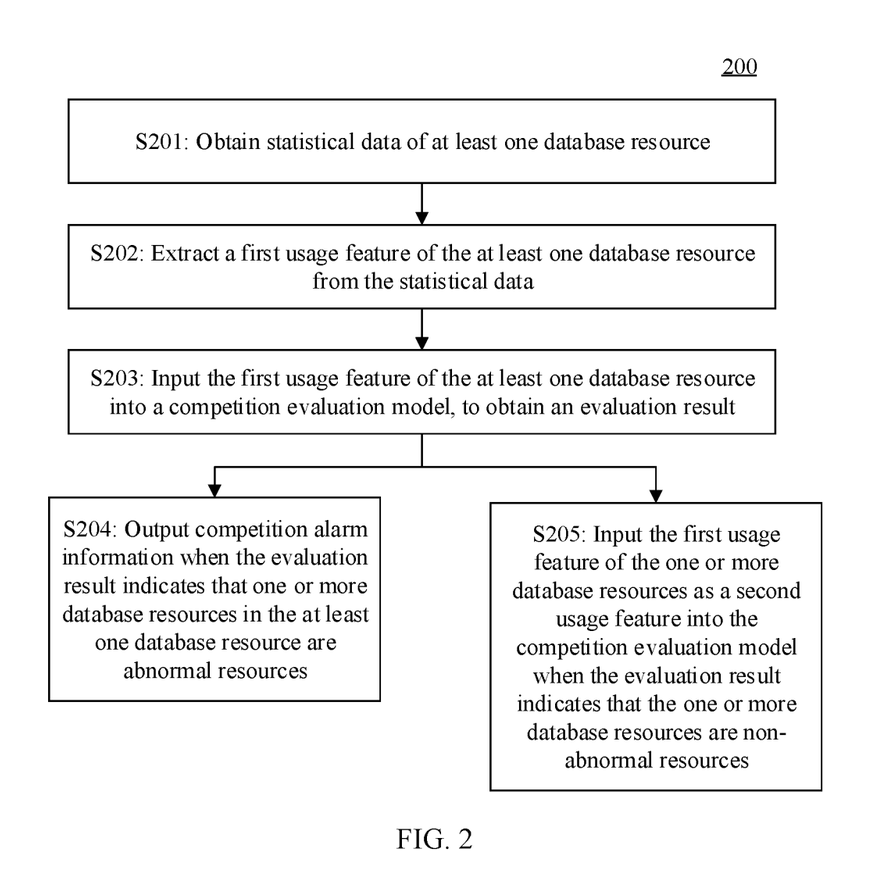
FIG. 2 is a schematic flowchart of a database management method according to an embodiment of this application.

FIG. 2 is a schematic flowchart of a database management method according to an embodiment of this application. As shown in FIG. 2, a database management method 200 may include the following steps.

S201: A database management system obtains statistical data of at least one database resource (namely, a first database resource).

It may be understood that the database management system may obtain the statistical data of the first database resources in a plurality of manners. This is not specifically limited in this embodiment of this application. The statistical data of the at least one database resource may be usage data, obtained through statistical collection within a period of time, of the at least one database resource in a database. Herein, usage data of a plurality of database resources may be collected at the same time, or usage data of one database resource may be collected. This may be specifically determined based on an actual requirement. This is not specifically limited in this embodiment of this application.

For example, the database management system may access the database based on a preset period (for example, one hour, five hours, one day, or one week), to obtain statistical data of at least one database resource within the period. In this case, the statistical data may be usage data, collected within one period, of the at least one database resource. The preset period herein may be understood as a statistical period, a maintenance period, a monitoring period, or the like that is set by the database management system for the database. For a high concurrent scenario, the preset period may alternatively be set to short duration, for example, five seconds, one minute, or five minutes. A person of ordinary skill in the art may set the duration of the preset period based on an actual requirement. This is not specifically limited in this embodiment of this application.

Alternatively, the database management system may access the database based on operations of the DBA, to obtain statistical data of at least one database resource within the period. For example, the DBA triggers competition detection on a foreground interface of the database management system, and the database management system responds to this operation and accesses the database, to obtain usage data that is of at least one database resource and that is collected in a period of time from previous competition detection to a current moment.

In addition, the database management system may alternatively access the database when a trigger condition is met, to obtain statistical data of at least one database resource within a current period. For example, the trigger condition may be that a competitive bottleneck occurs in the database system, that database access traffic surges, or the like. Certainly, the trigger condition may be configured by a user based on an actual requirement, or may be configured by default. This is not specifically limited in this embodiment of this application.

In some possible implementations, the database resource may be a lock (which may also be understood as a critical area corresponding to the lock) in the database, a page, or the like.

For example, when the foregoing database resource is the lock, for an $i^{th}$ type lock (it is assumed that the $i^{th}$ type lock is denoted as spinlock_i, and i is a positive integer) in one session, usage data of the database resource (namely, lock usage data) may include at least one of the following features: a quantity of query times (requests) of spinlock_i, block sleep time (sleeps) of spinlock_i, a quantity of failures (fails) in obtaining spinlock_i, and a quantity of successes (spins) in obtaining spinlock_i. Certainly, the usage data of the lock may further include other usage data of each type of lock. This is not specifically limited in this embodiment of this application.

Alternatively, when the database resource is a page, for a $j^{th}$ page (it is assumed that the $j^{th}$ page is denoted as page_j, and j is a positive integer) in one storage pool, usage data of the database resource (namely, page usage data) may include at least one of the following features: a quantity of query times (spins) of a bucket-level lock of a bucket in which page_j is located, a quantity of copy times (memcpys) of page_j, and a length (bucket_len) of the bucket in which page_j is located.

During actual application, an identifier (pool ID) of the storage pool in which page_j is located, a file name (file) of a file to which page_j belongs, and a page identifier (page ID) of page_j are included.

Certainly, the page usage data may further include other page usage data. This is not specifically limited in this embodiment of this application.

It should be noted that, when the database resource is another resource, the usage data of the database resource may include other data, and a person skilled in the art may perform setting based on actual application. This is not specifically limited in this embodiment of this application.

In some possible implementations, to collect statistics on the usage data of the database resource, a view (for example, a lock view or a page view) corresponding to the database resource may be created (or added) in the database. The database management system may obtain corresponding statistical data by querying different views.

For example, the lock view (for example, denoted as dv_spinlocks) corresponding to each type of lock may be added to the database, where dv_spinlocks is used to query the lock usage data in real time, so that the database management system can access the database, query dv_spinlocks, to obtain statistical data of each type of lock. Alternatively, the page view (for example, denoted as dv_page) corresponding to the page may be added to the database, where dv_page is used to collect statistics on usage data of all pages within this period, so that the database management system can access the database, query dv_page, to obtain statistical data of the all pages.

Optionally, corresponding dv_spinlocks is collected for each session, and corresponding dv_page is collected for each storage pool.

In this embodiment of this application, for example, for an OLTP system, the foregoing lock may be but is not limited to that shown in Table 1.

TABLE 1

| Lock | Name | Description |
|---|---|---|
| SPIN_TXN | "TXN" | Transaction information lock (transaction status critical area) |
| SPIN_TXN_LIST | "TXN_LIST" | Transaction-bound undo page information lock |
| SPIN_INC_SCN | "INC_SCN" | Transaction sequence commit number (SCN) lock |
| SPIN_REDO_BUF | "REDO_BUFFER" | Redo log cache lock |
| SPIN_COMMIT_QUEUE | "COMMIT_QUEUE" | Log commit queue lock |
| SPIN_CKPT_QUEUE | "CKPT_QUEUE" | Checkpoint queue lock |
| SPIN_BUFFER | "BUFFER" | Cache pool lock |
| SPIN_BUCKET | "BUCKET" | Bucket-level (BUCKET) lock |
| SPIN_SPACE | "SPACE" | Tablespace lock |
| SPIN_LOG_FLUSH | "LOG_FLUSH" | Log flush lock |

Certainly, the lock may further include another type of lock such as a mutex, and a spinlock in the OLTP system, or may include a mutex, a spinlock, and the like in another database system. This is not specifically limited in this embodiment of this application.

In this case, for each type of lock in the database, dv_spinlocks may include the usage data (which may also be referred to as the lock usage data) of each type of lock that is obtained through statistical collection. For each page in the database, dv_page may include the usage data (which may also be referred to as the page usage data) of each page through statistical collection. Further, to identify each type of lock, in addition to the lock usage data of each type of lock, dv_spinlocks may further include a session identifier (session ID) in which each type of lock is located, and a lock type of each type of lock. To identify each page, in addition to the page usage data of each page, dv_page may further include the identifier (pool ID) of the storage pool in which each page is located, the file name (file) of the file to which each page belongs, and the page identifier (page ID) of each page.

Figure 3:
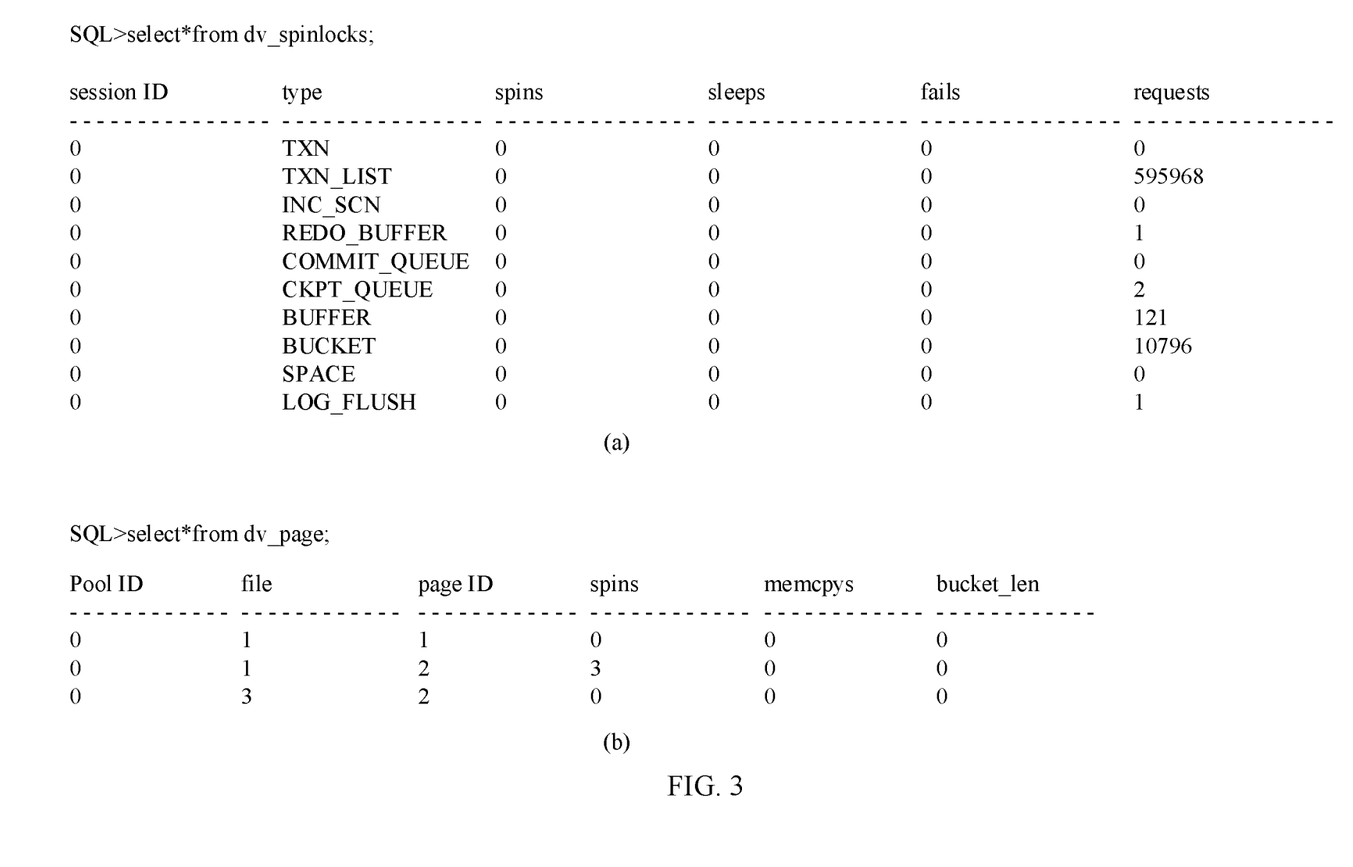
FIG. 3 is an example of dv_spinlocks and dv_page according to an embodiment of this application.

For example. FIG. 3 is an example of dv_spinlocks and dv_page according to an embodiment of this application. FIG. 3 (a) shows dv_spinlocks. In dv_spinlocks, lock usage data of 10 types of locks: TXN, TXN_LIST, INC_SCN, REDO_BUFFER, COMMIT_QUEUE, CKPT_QUEUE, BUFFER, BUCKET, SPACE, and LOG_FLUSH in a session whose session ID is ( ) are collected. For the 10 types of locks, a spins value, a sleeps value, and a fails value are all 0). A requests value of TXN_LIST is 595968. A requests value of REDO_BUFFER is 1. A requests value of CKPT_QUEUE is 2. A requests value of BUFFER is 121. A requests value of BUCKET is 10796. A requests value of LOG_FLUSH is 1. FIG. 3 (b) shows dv_page. In dv_page, for a storage pool whose ID is 0, through statistical collection, a spins value of page 1 (that is, a page ID is 1) belonging to file 1 (namely, a file whose file ID is 1) is 0, a spins value of page 2 belonging to the file 1 is 3, a spins value of page 2 belonging to file 3 is ( ) and memcpys values and bucket_len values of page 1 belonging to file 1, memcpys values and bucket_len values of page 2 belonging to file 1, and memcpys values and bucket_len values of page 2 belonging to file 3 are all 0.

It should be noted that dy_spinlocks and dy_page in FIG. 3 are merely examples of the lock view and the page view; and are not used to limit the lock view and the page view:

In some possible embodiments, when querying a view corresponding to the at least one database resource, the database management system may execute, for example, a select statement, to obtain the statistical data of the at least one database resource. For example, for the select statement, refer to "select*from dv_spinlocks" or "select*from dv_page" shown in FIG. 3.

After S201, S202 is performed. S202: The database management system extracts a first usage feature of the at least one database resource from the statistical data.

It may be understood that, after S201 in which the database management system obtains the usage data of the at least one database resource from the database, the database management system may perform feature extraction based on the usage data, that is, extract a specific value of each piece of data in the usage data, to obtain the first usage feature of the at least one database resource.

For example, the usage data of the database resource is the lock usage data, and a lock usage feature F (namely, the first usage feature) of spinlock_i may be obtained by using the following formula (1):

$$F=(S_{se},\alpha_1,\alpha_2,\alpha_3,\ldots,\alpha_i,\ldots,\alpha_n) \qquad (1)$$

$S_{se}$ is a quantity of current sessions. n is a quantity of lock types. $\alpha_i$ (i=1, 2, 3, . . . , n) is a lock usage feature of spinlock_i (namely, the $i^{th}$ type lock).

$$\alpha_i = \left(\frac{c1_i}{c1_i + c2_i}, \frac{c2_i}{c1_i + c2_i}, \frac{s_i}{Sa}\right),$$

where $cl_i$ is a quantity of query times (a requests value) of spinlock_i, $s_i$ is block sleep time of spinlock_i (a sleeps value), $c2_i$ is a quantity of successes (a spins value) in obtaining spinlock_i, and Sa is total lock block sleep time of a thread (which may be understood as a sum of sleeps values of each type of lock). $S_{se}$, n, $cl_i$, $s_i$, $c2_i$, and Sa are all positive integers.

Alternatively, for example, the usage data of the database resource is the page usage data. A page usage feature F (namely, the first usage feature) of page_j may be obtained by using the following formula (3):

$$F=(\beta_1,\beta_2,\beta_3,\ldots,\beta_j,\ldots,\beta_m) \quad (2)$$

$\beta_j$ (j=1, 2, 3, . . . , m) is a page usage feature of page_j (namely, the $j^{th}$ page $$\beta_j = \left(\frac{cp_j}{cb_j}, cm_j, cc_j\right),$$

where $cp_j$ is a quantity of query times (a spins value) of a lock of a bucket in which page_j (namely, the $j^{th}$ page) is located, $cb_j$ is a quantity of total query times of the lock of the bucket in which page_j is located (which may be understood as a sum of spins values of page_j), $cm_j$ is a quantity of copy times of page_j (a memcpys value), and $cc_j$ is a length (a bucket_len value) of the bucket in which page_j is located. m, $cp_j$, $cb_j$, $cm_j$, and $cc_j$ are positive integers.

It should be noted that, in some possible implementations, the lock usage data or the page usage data may include the one or a combination of a plurality of features. An expression of a lock usage feature of each type of lock or an expression of a page usage feature of each page may include a feature value of one corresponding feature or a combination of feature values of a plurality of corresponding features. For example, if the lock usage data of spinlock_i includes requests and spins, $$\alpha_i = \left(\frac{cl_i}{cl_i+c2_i}\right), \alpha_i = \left(\frac{c2_i}{cl_i+c2_i}\right), \text{ or } \alpha_i = \left(\frac{cl_i}{cl_i+c2_i}, \frac{c2_i}{cl_i+c2_i}\right).$$

If the lock usage data of spinlock_i includes only sleeps, $$\alpha_i = \left(\frac{s_i}{Sa}\right).$$

Certainly, the lock usage data may include another feature combination, and corresponding $\alpha_i$ may include a combination of feature values of these features. In addition, if page usage data of page_j includes only spins, $$\beta_j = \left(\frac{cp_j}{cb_j}\right).$$

If page usage data of page_j includes only memcpys, $\beta_j$= ($cm_j$). If the page usage data of page_j includes only bucket_len, $\beta_j$=($cc_j$). If the page usage data of page_j includes any combination of spins, memcpys, and bucket_len, $\beta_j$ may include a corresponding combination of $$\frac{cp_j}{cb_j},$$

$cm_j$, and $cc_j$. During actual application, a person skilled in the art may set the usage data of the database resource based on an actual requirement, and then obtain a corresponding usage feature in S202. This is not specifically limited in this embodiment of this application.

Then, after the feature extraction is completed in S202, S203 is performed. S203: The database management system inputs the first usage feature of the at least one database resource into a competition evaluation model, to obtain an evaluation result. The evaluation result indicates whether one or more database resources (namely, second database resources) in the at least one database resource are abnormal resources (for example, abnormal locks or hotpages). The abnormal resource is a database resource in which a competitive bottleneck occurs.

It may be understood that the database management system inputs the first usage feature (for example, F), as an input feature, of the at least one database resource obtained in S202 into a trained competition evaluation model, and identifies, based on the evaluation result of the competition evaluation model, a database resource in which abnormal competition occurs in the at least one database resource. For example, when an input vector is the lock usage feature, the competition evaluation model may identify whether each type of lock is an abnormal lock, that is, identify a lock in which abnormal competition occurs in each type of lock. When an input vector is the page usage feature, the competition evaluation model may identify whether each page is the hotpage, that is, identify a page in which abnormal competition occurs in all pages.

Optionally, the competition evaluation model is obtained through training based on a second usage feature of the at least one database resource. Herein, the second usage feature may be a usage feature sample of the at least one database resource specially used to train the competition evaluation model, or may be a usage feature extracted from historical usage data (or existing usage data) of the at least one database resource. Certainly, the second usage feature may alternatively be in another form. This is not specifically limited in this embodiment of this application.

In some possible implementations, if the database resource is a lock, the competition evaluation model may be a model trained by using a self-organizing map (SOM), a counter propagation (CP) network, an adaptive resonance theory (ART) network, and a clustering algorithm such as a k-means clustering algorithm. During actual application, the competition evaluation model may alternatively be trained and constructed by using another clustering algorithm. This is not specifically limited in this embodiment of this application.

Optionally, when the competition evaluation model is a model trained and constructed by using the SOM, a quantity of neurons at an output layer may be selected based on experience, or a quantity of neurons equal to a quantity of sessions may be selected. Further, each session may be described by using a plurality of neurons.

Alternatively, if the database resource is a page, the competition evaluation model may be a binary classifier trained by using a logistic regression algorithm. During actual application, the competition evaluation model may alternatively be trained and constructed by using another binary classification algorithm. This is not specifically limited in this embodiment of this application.

S204: The database management system outputs competition alarm information when the evaluation result indicates that one or more database resources in the at least one database resource are abnormal resources. The competition alarm information indicates that the competitive bottleneck occurs in the one or more database resources.

It may be understood that the database management system inputs the first usage feature (for example, F) of the at least one database resource as an input vector into the competition evaluation model. The competition evaluation model outputs the evaluation result. If the evaluation result indicates that the one or more database resources in the at least one database resource are abnormal resources, the database management system outputs the competition alarm information, to indicate that the competitive bottleneck occurs in the one or more database resources.

In a specific implementation, output competition alarm information may carry an identifier of a target database resource. In this way, after viewing the competition alarm information, the DBA can accurately locate, based on an identifier or identifiers of the one or more database resources, the database resource in which the competitive bottleneck occurs. Further, the DBA can perform precise optimization on the competitive bottleneck, to improve maintainability of the database.

For example, when the one or more database resources are locks, it is assumed that the evaluation result indicates that spinlock_i is the abnormal lock, the competition alarm information may carry a session ID of a session in which spinlock_i is located and a type value of spinlock_i, to accurately indicate to the DBA that the competitive bottleneck occurs in spinlock_i. Further, the competition alarm information may further carry a requests value of spinlock_i, a sleeps value of spinlock_i, a fails value of spinlock_i, a spins value of spinlock_i, and the like. Certainly, the competition alarm information may further carry other usage data of spinlock_i, provided that the competition alarm information can accurately indicate that the competitive bottleneck occurs in spinlock_i. This is not specifically limited in this embodiment of this application.

In addition, when the one or more database resources are pages, provided that the evaluation result indicates that page_j is the hotpage, the competition alarm information may carry a pool ID of page_j, a file value of page_j, and a page ID of page_j, to accurately indicate page_j. Further, the competition alarm information may further carry a spins value of page_j, a memcpys value of page_j, a bucket_len value of page_j, and the like. Certainly, the competition alarm information may further carry other usage data of page_j, provided that the competition alarm information can accurately indicate that the competitive bottleneck occurs in page_j. This is not specifically limited in this embodiment of this application.

Further, after S203, the database management method 200 may further include S205. S205: When the evaluation result indicates that the one or more database resources are non-abnormal resources, the database management system may input the first usage feature of the one or more database resources as the second usage feature into the competition evaluation model, to train the competition evaluation model.

It may be understood that the database management system inputs the first usage feature (for example, F) of the at least one database resource as the input vector into the competition evaluation model. The competition evaluation model outputs the evaluation result. If the evaluation result indicates that the one or more database resources in the at least one database resource are non-abnormal resources, that is, no competitive bottleneck occurs in some or all database resources in the at least one database resource, the database management system may further train the competition evaluation model by using the first usage feature, to improve accuracy of the competition evaluation model, and further improve performance of the database system.

In this embodiment of this application, the database management system identifies the database resource in which the competitive bottleneck occurs in the database system by using the competition evaluation model, to accurately locate the competitive bottleneck. Further, after locating the competitive bottleneck, the database management system notifies the DBA of the competitive bottleneck, so that the DBA can perform the precise optimization on the competitive bottleneck. This greatly reduces workload of the DBA, helps the DBA find a problem in time, and improve maintainability of the database.

In some possible implementations, to further reduce workload of the DBA and provide better user experience, still refer to FIG. 2, after S203, the database management method 200 may further include the following steps.

S206: The database management system obtains optimization information corresponding to the one or more database resources when the evaluation result indicates that the one or more database resources are abnormal resources.

S205: The database management system outputs the competition alarm information and the optimization information.

Herein, the optimization information indicates an optimization policy corresponding to the one or more database resources.

For example, if the abnormal resources are checkpoint queue locks, the associated optimization policy may be adjusting a refresh frequency. If the abnormal resources are log submission queue locks, the associated optimization policy may be adjusting a quantity of lock slots or using group commit. If the abnormal resources are buffer bucket-level locks, the associated optimization policy may be that a hash function is adjusted. If the abnormal resources are hotpages, the associated optimization policy may be adjusting a page storage density and partitioning a table in which the page is located. If a table in which the page is located is a read-only table, the table can be set to resident memory. Certainly, different abnormal resources may be associated with different optimization policies. This is not specifically limited in this embodiment of this application.

It may be understood that, to help the DBA analyze a status of the database system, the database management system may further associate different optimization policies for different abnormal resources. When the evaluation result in S203 identifies the one or more database resources in the at least one database resource as the abnormal resources, in addition to outputting the competition alarm information in S204, the database management system may further output the optimization information associated with the one or more database resources, to indicate that the optimization policy may be used for the abnormal resources of the one or more database resources. Therefore, the DBA can quickly locate a performance problem, analyze system status under load, and provide a corresponding optimization solution based on the competition alarm information and the optimization information, to improve maintainability of the database system.

For example, if the one or more resources are bucket-level locks (SPIN_BUCKET), the competition alarm information output by the database management system may further carry an identifier of a page associated with SPIN_BUCKET.

In some possible implementations, in S206, the database management system may output the one or more database resources and the optimization information corresponding to the one or more database resources in a view manner.

The following describes the foregoing database management method by respectively using examples in which a database resource is a lock and in which a database resource is a page.

Figure 4:
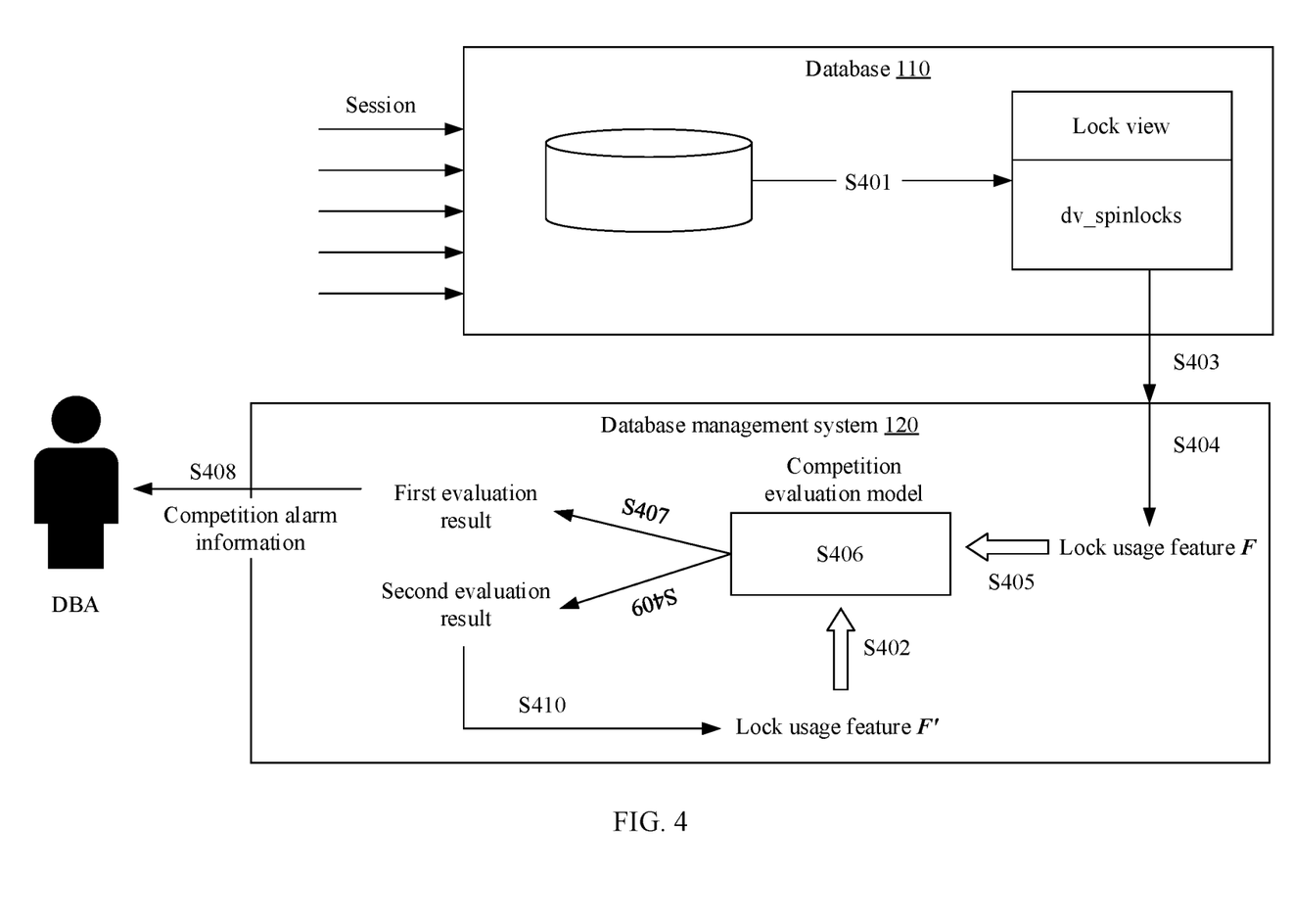
FIG. 4 is a schematic flowchart of another database management method according to an embodiment of this application.

It is assumed that a database resource is a lock. FIG. 4 is a schematic flowchart of another database management method according to an embodiment of this application. A database management method 400 may include the following steps.

S401: A database collects statistics on usage data of each type of lock by using dv_spinlocks.

S402: A database management system trains an SOM model by using a lock usage feature F', to obtain a competition evaluation model, where the lock usage feature F' may be understood as the second usage feature in the foregoing embodiment.

S403: The database management system accesses dv_spinlocks by using a select statement, to obtain statistical data of each type of lock.

S404: The database management system performs feature extraction on the statistical data of each type of lock, to obtain a lock usage feature F, where F may be understood as the first usage feature in the foregoing embodiment.

S405: The database management system inputs the lock usage feature F into the competition evaluation model, namely, the SOM model.

S406: The database management system uses the competition evaluation model to calculate a distance between $\alpha_i$ usage feature (namely, $\alpha_1, \alpha_2, \alpha_3, \ldots, \alpha_i, \ldots, \alpha_{n-1}$, and $\alpha_n$) of each type of lock in the lock usage feature F and a superior feature point; and if a distance between $\alpha_i$ and a superior feature corresponding to $\alpha_i$ exceeds a preset threshold, performs S407: or if a distance between $\alpha_i$ and a superior feature corresponding to $\alpha_i$ does not exceed a preset threshold, performs S409.

S407: The database management system obtains a first evaluation result of the competition evaluation model, for example, the first evaluation result indicates that spinlock_i is an abnormal lock.

S408: The database management system outputs competition alarm information to indicate that spinlock_i is an abnormal lock.

S409: The database management system obtains a second evaluation result of the competition evaluation model, for example, the second evaluation result indicates that spinlock_i is a non-abnormal lock.

S410: The database management system uses the lock usage feature F of spinlock_i as the lock usage feature F', and returns to S402 to train the competition evaluation model.

Figure 5:
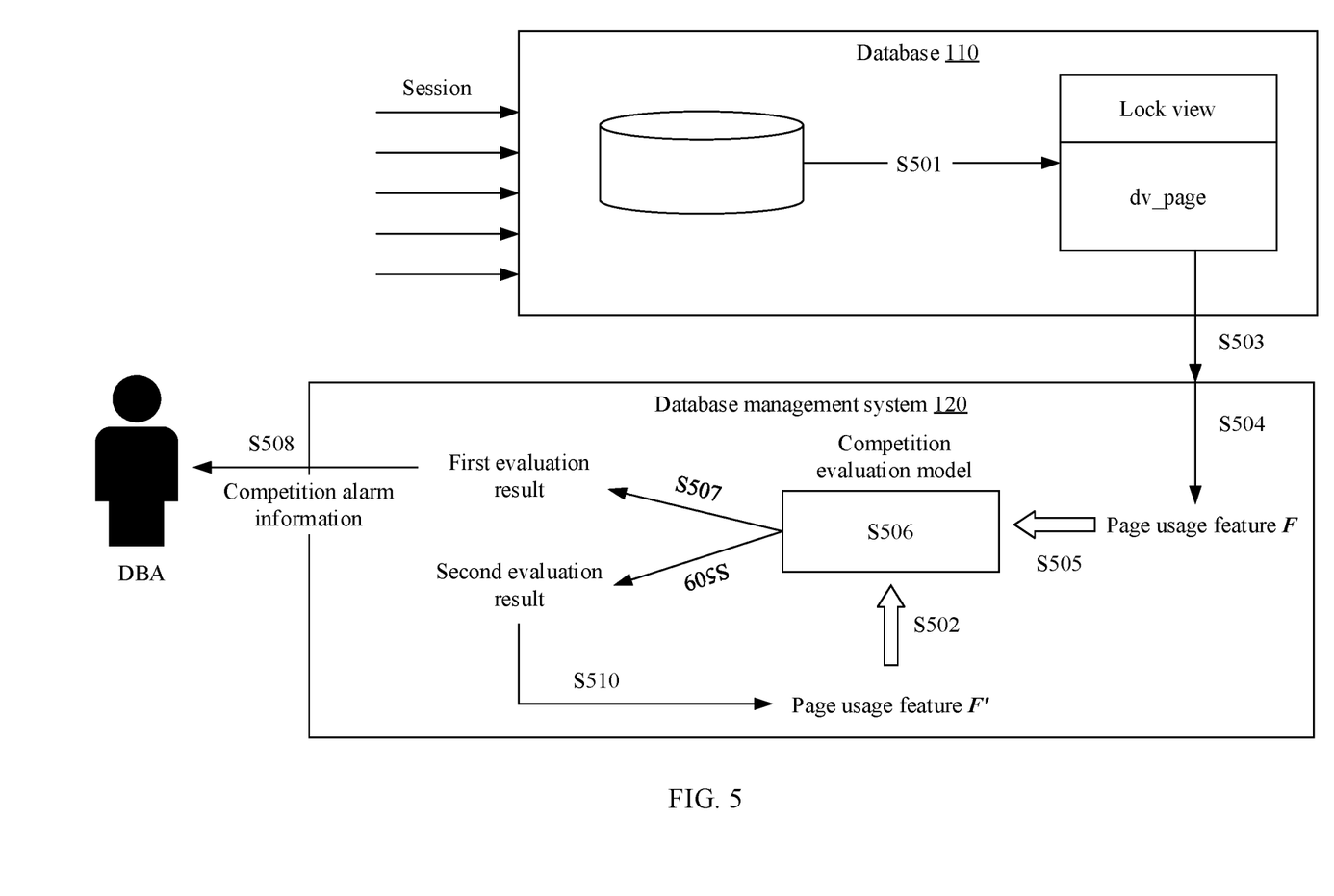
FIG. 5 is a schematic flowchart of still another database management method according to an embodiment of this application.

Alternatively, it is assumed that a database resource is a page. FIG. 5 is a schematic flowchart of still another database management method according to an embodiment of this application. A database management method 500 may include the following steps.

S501: A database collects statistics on usage data of each page in the database by using dv_page.

S502: A database management system trains a binary classifier by using a page usage feature F', to obtain a competition evaluation model, where the page usage feature F' may be understood as the second usage feature in the foregoing embodiment.

S503: The database management system accesses dv_page by using a select statement, to obtain statistical data of each page.

S504: The database management system performs feature extraction on the statistical data of each page to obtain a page usage feature F, where F may be understood as the first usage feature in the foregoing embodiment.

S505: The database management system inputs the page usage feature F into the competition evaluation model, namely, the binary classifier.

S506: The database management system performs binary classification on a usage feature (namely, $\beta_1, \beta_2, \beta_3, \ldots, \beta_j, \ldots, \beta_{m-1}$, and $\beta_m$) of each page in the page usage feature F by using the competition evaluation model; and if page_j is an abnormal page, performs S507: or if page_j is a non-abnormal page, performs S509.

S507: The database management system obtains a first evaluation result of the competition evaluation model.

S508: The database management system outputs competition alarm information to indicate that page_j is an abnormal page.

S509: The database management system obtains a second evaluation result of the competition evaluation model.

S510: The database management system uses the page usage feature F of page_j as the page usage feature F', and returns to S502 to train the competition evaluation model.

Based on a same inventive concept, an embodiment of this application further provides a database management apparatus. The database management apparatus may be the foregoing database management system or a chip or a system on chip in a database management system, or may be a functional module that is in a database management system and that is configured to implement the method in any possible implementation in the foregoing embodiments. The database management apparatus may implement functions performed by the database management system in any possible implementation in the foregoing embodiments. The functions may be implemented by hardware executing corresponding software. The hardware or software may include one or more modules corresponding to the foregoing functions.

Figure 6:
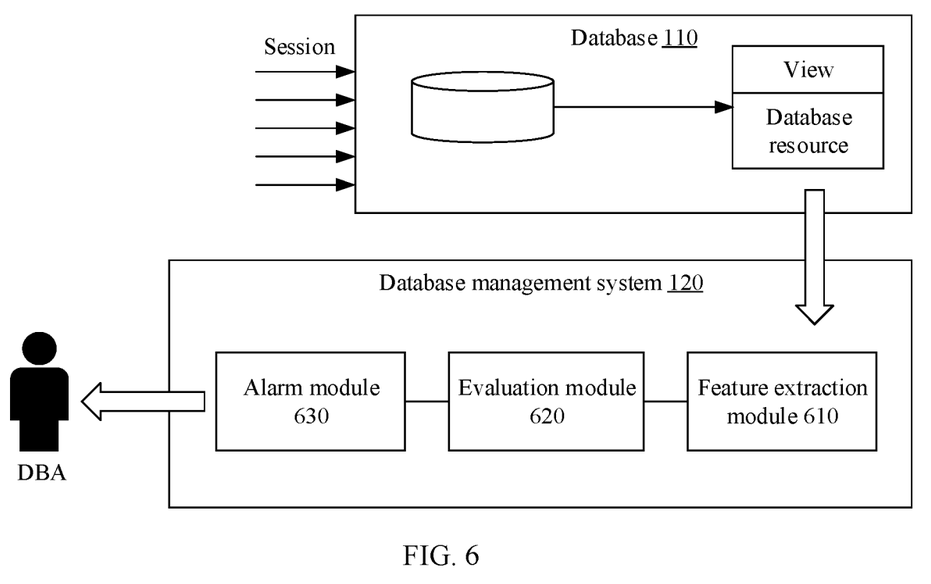
FIG. 6 is a schematic diagram of a structure of a database management apparatus according to an embodiment of this application.

FIG. 6 is a schematic diagram of a structure of a database management apparatus according to an embodiment of this application. As shown in FIG. 6, a database management apparatus 600 may include: a feature extraction module 610, configured to: obtain statistical data of first database resources in a database, where the statistical data is usage data of the first database resources that is obtained through statistical collection; and extract a first usage feature of the first database resources from the statistical data: an evaluation module 620, configured to input the first usage feature into a competition evaluation model, to obtain an evaluation result, where the competition evaluation model is obtained through training based on a second usage feature of the first database resources; and an alarm module 630, configured to output competition alarm information when the evaluation result indicates that a second database resource is an abnormal resource, where the competition alarm information indicates that a competitive bottleneck occurs in the second database resource, and the second database resource is some or all of the first database resources.

In some possible implementations, the alarm module 630 is further configured to: obtain optimization information corresponding to the second database resource when the evaluation result indicates that the second database resource is an abnormal resource; and output the optimization information, where the optimization information indicates an optimization policy associated with the second database resource.

In some possible implementations, the feature extraction module 610 is specifically configured to query a first view corresponding to the first database resources in the database, to obtain the statistical data. The first view is used to collect statistics on the usage data of the first database resources.

In some possible implementations, when the first database resources include at least one type of lock in the database, for a first lock in the at least one type of lock, the first view includes one or a combination of the following plurality of pieces of data: a quantity of query times of the first lock, block sleep time of the first lock, a quantity of failures in obtaining the first lock, and a quantity of successes in obtaining the first lock.

In some possible implementations, the second database resource is an abnormal lock.

In some possible implementations, when the second database resource is a bucket-level lock, the competition alarm information carries a page identifier associated with the bucket-level lock.

In some possible implementations, the evaluation module 620 is specifically configured to: calculate a distance between the first usage feature and a superior feature; and output a first evaluation result if the distance exceeds a preset threshold, where the first evaluation result indicates that the second database resource is the abnormal resource: or output a second evaluation result if the distance does not exceed a preset threshold, where the second evaluation result indicates that the second database resource is a non-abnormal resource.

In some possible implementations, when the first database resources include at least one page in the database, for a first page in the at least one page, the first view includes one or a combination of the following plurality of pieces of data: a quantity of query times of a lock of a bucket in which the first page is located, a quantity of copy times of the first page, and a length of the bucket in which the first page is located.

In some possible implementations, the second database resource is a hotpage.

In some possible implementations, the evaluation module 620 is specifically configured to perform binary classification on the first usage feature by using a logistic regression function, to output the evaluation result, where the evaluation result indicates whether the second database resource is an abnormal resource.

In some possible implementations, the feature extraction module 610 is configured to query the first view by selecting an interface.

In some possible implementations, a database resource includes the lock or the page.

Based on a same inventive concept, an embodiment of this application provides a database management system, including the data management apparatus according to any one of the foregoing embodiments.

Figure 7:
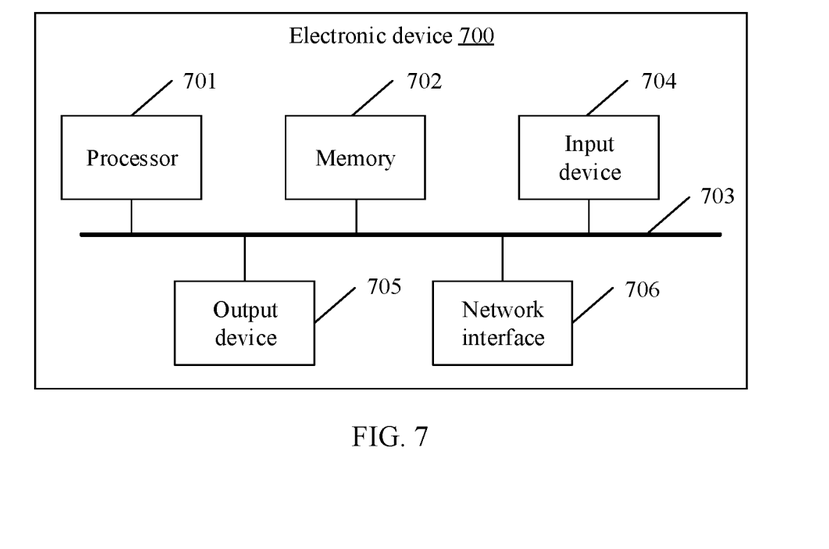
FIG. 7 is a schematic diagram of a structure of an electronic device according to an embodiment of this application.

Based on a same inventive concept, an embodiment of this application provides an electronic device. FIG. 7 is a schematic diagram of a structure of an electronic device according to an embodiment of this application. As shown in FIG. 7, an electronic device 700 uses general-purpose computer hardware, and include a processor 701, a memory 702, a bus 703, an input device 704, and an output device 705.

In some possible implementations, the memory 702 may include a computer storage medium in a form of a volatile and/or nonvolatile memory, for example, a read-only memory and/or a random access memory. The memory 702 may store an operating system, an application program, another program module, executable code, program data, user data, and the like.

The input device 704 may be configured to input a command and information to the electronic device. The input device 704 is a keyboard or a pointing device, for example, a mouse, a trackball, a touchpad, a microphone, a joystick, a game pad, a satellite television antenna, a scanner, or a similar device. These input devices may be connected to the processor 701 through the bus 703.

The output device 705 may be used by the electronic device to output information. In addition to a monitor, the output device 705 may alternatively be another peripheral output device, for example, a loudspeaker and/or a print device. These output devices may also be connected to the processor 701 through the bus 703.

The electronic device may be connected to a network, for example, a local area network (LAN), through a network interface 706. In a network connection environment, computer-executable instructions stored in a control device may be stored in a remote storage device, and are not limited to being locally stored.

When the processor 701 in the electronic device executes the executable code or the application program stored in the memory 702, the electronic device executes the database management method on the database management system side in the foregoing embodiments. For a specific execution process, refer to the foregoing embodiments. Details are not described herein again.

In addition, the memory 702 stores computer-executable instructions used to implement functions of a feature extraction module 610, an evaluation module 620, and an alarm module 630 in FIG. 6. Functions/implementation processes of the feature extraction module 610, the evaluation module 620, and the alarm module 630 in FIG. 6 may all be implemented by the processor 701 in FIG. 7 by invoking the computer-executable instructions stored in the memory 702. For specific implementation processes and functions, refer to the foregoing related embodiments.

Based on a same inventive concept, an embodiment of this application provides a computer-readable storage medium. The computer-readable storage medium stores instructions. When the instructions are run on a computer, the database management method according to any one of the foregoing embodiments is performed.

Based on a same inventive concept, this application provides a computer program product. When the computer program product is executed on a computer, the computer is enabled to implement the database management method according to any one of the foregoing embodiments.

A person skilled in the art can appreciate that functions described with reference to various illustrative logical blocks, modules, and algorithm steps disclosed and described in this specification may be implemented by hardware, software, firmware, or any combination thereof. If implemented by the software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium such as a data storage medium, or may include any communication medium that facilitates transmission of a computer program from one place to another (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example, and not limitation, the computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the above should also be included within the scope of the computer-readable medium.

Instructions may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of an apparatus configured to perform the disclosed techniques, but the functions do not need to be implemented by different hardware units. Actually, as described above, various units may be combined into a codec hardware unit in combination with appropriate software and/or firmware, or may be provided by interoperable hardware units (including the one or more processors described above).

In the foregoing embodiments, descriptions of each embodiment have different emphasis. For a part that is not described in detail in an embodiment, refer to related descriptions of other embodiments.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A database management method comprising:
   obtaining statistical data by querying a first view associated with first database resources in a database,
      wherein the first view is used to collect statistics on usage data of the first database resources,
      wherein the first view comprises one or a combination of the following features: a quantity of query times of a first lock in the database, block sleep time of the first lock, a quantity of failures in obtaining the first lock, and a quantity of successes in obtaining the first lock,
      wherein the first lock is one type of lock in the database, and
      wherein the statistical data is usage data of the first database resources that is obtained through statistical collection;
   extracting a first usage feature of the first database resources from the statistical data;
   inputting the first usage feature into a competition evaluation model to obtain an evaluation result,
      wherein the competition evaluation model is obtained through training based on a second usage feature of the first database resources; and
   outputting competition alarm information when the evaluation result indicates that a second database resource is an abnormal resource,
      wherein the competition alarm information indicates that a competitive bottleneck occurs in the second database resource, and
      wherein the second database resource is some or all of the first database resources.

2. The method according to claim 1, wherein the method further comprises:
   obtaining optimization information associated with the second database resource based on the evaluation result indicating the second database resource is the abnormal resource; and
   outputting the optimization information, which indicates an optimization policy associated with the second database resource.

3. The method according to claim 1, wherein the second database resource is an abnormal lock.

4. The method according to claim 1, wherein when the second database resource is a bucket-level lock, the competition alarm information carries a page identifier associated with the bucket-level lock.

5. The method according to claim 1, wherein based on the first database resources comprising at least one page in the database, for a first page in the at least one page, the first view comprises one or a combination of the following plurality of features:

a quantity of query times of a lock of a bucket in which the first page is located, a quantity of copy times of the first page, and a length of the bucket in which the first page is located.

6. The method according to claim 5, wherein the second database resource is a hotpage.

7. The method according to claim 1, wherein querying the first view corresponding the associated with the first database resources in the database comprises querying the first view by using a select statement.

8. The method according to claim 1, wherein inputting the first usage feature into the competition evaluation model to obtain the evaluation result comprises calculating a distance between the first usage feature and a superior feature; and
outputting a first evaluation result based on the distance exceeding a preset threshold, wherein the first evaluation result indicates that the second database resource is the abnormal resource;
or
outputting a second evaluation result based on the distance not exceeding a preset threshold, wherein the second evaluation result indicates that the second database resource is a non-abnormal resource.

9. The method according to claim 1, wherein inputting the first usage feature into the competition evaluation model to obtain the evaluation result comprises:
performing binary classification on the first usage feature, by using a logistic regression function, to output the evaluation result indicating whether the second database resource is an abnormal resource.

10. The method according to claim 1, wherein the first database resources comprise the first lock or a page.

11. An electronic device comprising a processor and a memory, wherein the processor is coupled to the memory, and the processor is configured to read and execute instructions in the memory, to implement the following operations:
obtaining statistical data by querying a first view associated with first database resources in a database,
wherein the first view is used to collect statistics on usage data of the first database resources,
wherein the first view comprises one or a combination of the following features: a quantity of query times of a first lock in the database, block sleep time of the first lock, a quantity of failures in obtaining the first lock, and a quantity of successes in obtaining the first lock,
wherein the first lock is one type of lock in the database, and
wherein the statistical data is usage data of the first database resources that is obtained through statistical collection:
extracting a first usage feature of the first database resources from the statistical data;
inputting the first usage feature into a competition evaluation model, to obtain an evaluation result,
wherein the competition evaluation model is obtained through training based on a second usage feature of the first database resources; and
outputting competition alarm information when the evaluation result indicates that a second database resource is an abnormal resource,
wherein the competition alarm information indicates that a competitive bottleneck occurs in the second database resource, and
wherein the second database resource is some or all of the first database resources.

12. The device according to claim 11, wherein the processor is further configured to read and execute instructions of obtaining optimization information associated with the second database resource based on the evaluation result indicating the second database resource is the abnormal resource; and
outputting the optimization information, which indicates an optimization policy associated with the second database resource.

13. The device according to claim 11, wherein obtaining statistical data of the first database resources in the database comprises:
querying a first view associated with the first database resources in the database to obtain the statistical data, wherein the first view is used to collect statistics on the usage data of the first database resources.

14. The device according to claim 11, wherein the second database resource is an abnormal lock.

15. The device according to claim 11, wherein based on the second database resource being a bucket-level lock, the competition alarm information carries a page identifier associated with the bucket-level lock.

16. The device according to claim 13, wherein based on the first database resources comprising at least one page in the database, for a first page in the at least one page, the first view comprises one or a combination of the following plurality of features:
a quantity of query times of a lock of a bucket in which the first page is located, a quantity of copy times of the first page, and a length of the bucket in which the first page is located.

17. The device according to claim 16, wherein the second database resource is a hotpage.

18. A non-transitory computer readable medium comprising instructions stored that, when executed by a processor, configure the processor to perform the following operations:
obtaining statistical data by querying a first view associated with first database resources in a database,
wherein the first view is used to collect statistics on usage data of the first database resources,
wherein the first view comprises one or a combination of the following features: a quantity of query times of a first lock in the database, block sleep time of the first lock, a quantity of failures in obtaining the first lock, and a quantity of successes in obtaining the first lock,
wherein the first lock is one type of lock in the database, and
wherein the statistical data is usage data of the first database resources that is obtained through statistical collection:
extracting a first usage feature of the first database resources from the statistical data;
inputting the first usage feature into a competition evaluation model, to obtain an evaluation result,
wherein the competition evaluation model is obtained through training based on a second usage feature of the first database resources; and
outputting competition alarm information when the evaluation result indicates that a second database resource is an abnormal resource,
wherein the competition alarm information indicates that a competitive bottleneck occurs in the second database resource, and
wherein the second database resource is some or all of the first database resources.

19. The non-transitory computer readable medium according to claim 18, wherein the instructions, when executed by the processor, further configure the processor to perform the following operations:
 obtaining optimization information corresponding to the second database resource based on the evaluation result indicating the second database resource is the abnormal resource; and
 outputting the optimization information, which indicates an optimization policy associated with the second database resource.

20. The non-transitory computer readable medium according to claim 18, wherein the instructions, when executed by the processor, further configure the processor to perform the following operations in connection with obtaining statistical data of the first database resources in the database:
 querying a first view corresponding to the first database resources in the database to obtain the statistical data, wherein the first view is used to collect statistics on the usage data of the first database resources.

\* \* \* \* \*

UNITED STATES PATENT AND TRADEMARK OFFICE
CERTIFICATE OF CORRECTION

| | | |
|---|---|---|
| PATENT NO. | : 12,298,843 B2 | Page 1 of 1 |
| APPLICATION NO. | : 18/357925 | |
| DATED | : May 13, 2025 | |
| INVENTOR(S) | : Yunfei Lu | |

It is certified that error appears in the above-identified patent and that said Letters Patent is hereby corrected as shown below:

In the Claims

Claim 7: Column 21, Line 8: "first view corresponding the associated with the first data-" should read as -- first view associated with the first data --.

Claim 11: Column 21, Line 52: "collection:" should read as -- collection; --.

Claim 18: Column 22, Line 52: "collection:" should read as -- collection; --.

Signed and Sealed this
Fourteenth Day of October, 2025

John A. Squires
*Director of the United States Patent and Trademark Office*